Patented June 3, 1941

2,244,283

UNITED STATES PATENT OFFICE 2,244,283

PREPARATION OF FORMALDEHYDE-UREA MOLDING COMPOSITIONS

Maurice H. Bigelow, Toledo, Ohio, assignor to Plaskon Company, Incorporated, Toledo, Ohio, a corporation of Delaware No Drawing. Application June 25, 1938, Serial No. 215,876

7 Claims. (Cl. 260—21)

The invention relates to the preparation of formaldehyde-urea molding compositions containing a lubricant.

When a formaldehyde-urea molding composition is formed into a finished article by hot-pressing in the usual manner, a suitable lubricant must be employed to prevent the article from sticking in the mold. If some of the composition adheres to the mold when the molded article is removed, the surface of the article is spoiled and the mold must be cleaned and polished before it can again be used.

It has been suggested that the interior of the mold be "greased" with a lubricant as a precaution against sticking. However, the mere application of a lubricant to the interior of a mold has proved to be insufficient to prevent sticking, because the molding composition in flowing under heat and pressure may wipe a portion of the mold's surface entirely bare of lubricant. Particles or drops of lubricant in the mold also may cause flaws in the surface of the finished article. The usual procedure is to incorporate a small amount of lubricant as one of the ingredients in the manufacture of the molding composition.

In order to be suitable for incorporation as one of the ingredients in a molding composition a lubricant must have certain important characteristics. It must be a perfectly non-gummy solid at ordinary temperatures so that it can be ground into a fine, fluffy powder. If a lubricant is even slightly gummy or greasy at ordinary temperatures, it cannot be properly mixed or dispersed into a molding composition. When an attempt is made to incorporate a gummy substance as an ingredient in a powdered molding composition by grinding in a ball mill, the gummy substance remains in small lumps or agglomerations which appear as specks in the surface of a molded article made from the composition.

Although a lubricant must not be gummy or greasy at room temperature, it must melt at the molding temperature to form an oily liquid capable of lubricating the mold. This oily liquid must not dissolve in the plastic composition during the molding, but must bleed out of the material to the mold's surface.

Some materials that might otherwise be satisfactory for incorporation in formaldehyde-urea molding compositions as lubricants have been discarded because they were found to be either too acid or too alkaline. An acid lubricant cannot be used in a formaldehyde-urea molding composition, because it renders the composition unstable, so that it gradually sets to an infusible mass. Alkaline lubricants are not satisfactory because they retard the hardening of the composition in the mold. The speed with which a formaldehyde-urea composition hardens in the mold is a highly important property that must not be impaired. Doubling the length of time required for hot-molding a given composition doubles the number of molds required for the same rate of production, and hot-molding equipment is expensive.

To be suitable for use in a formaldehyde-urea molding composition a lubricant must also be colorless, and it must not become colored upon being exposed to light.

Zinc stearate is the only lubricant heretofore known that satisfies these requirements. However, zinc stearate is detrimental to formaldehyde-urea molding compositions in that it tends to render the finished articles opaque. The use of zinc stearate limits the degree of translucency that can be attained when lighting diffusers are molded from formaldehyde-urea compositions. In many cases zinc stearate impairs the beauty of articles molded from formaldehyde-urea resins by rendering them opaque and dull-looking instead of brilliant and translucent. However, zinc stearate has been the most satisfactory lubricant available heretofore, and it has been in general use for a number of years in the manufacture of formaldehyde-urea molding compositions.

The principal object of the invention is the preparation of formaldehyde-urea molding compositions which contain an adequate amount of a permanently colorless, neutral lubricant in a dispersed condition that does not impair the translucency of articles molded from the composition. More specific objects and advantages are apparent from the description, which merely discloses and illustrates the invention and is not intended to impose limitations upon the claims.

A molding composition embodying the invention contains a lubricant selected from the group consisting of stearates and palmitates of zirconium, titanium and cerium. Such stearates and palmitates are salts of weak acids with very weak bases, and are therefore very difficult to prepare. When the preparation of the salts is carried out by methods heretofore known, the products obtained are quite gummy. They tend to become lumpy during storage and shipment, and they are so gummy that they cannot be dispersed into powdered materials by grinding in a ball mill. These stearates and palmitates would therefore not be expected to be suitable for incorporation in molding powders as lubricants.

However, in the preparation of molding powders in accordance with the invention, a non-gummy form of the stearate or palmitate of zirconium, titanium or cerium is used. This form of stearate or palmitate consists of a fluffy powder that shows no signs of gumminess and is easily dispersed with other powders by grinding.

Thus the invention is based not only upon the discovery of new lubricants that produce molded articles whose translucency is greatly superior to that of articles containing the lubricant that has been in general use for years, but also upon the discovery of a method of preparing the new lubricants for the first time in non-gummy form, so that it is possible to incorporate them in molding powders. The gumminess of these stearates and palmitates when prepared by methods heretofore known is caused by the presence of a substantial amount of stearic or palmitic acid. The stearic or palmitic acid cannot be detected analytically, because it is produced by hydrolysis of the stearate or palmitate into the acid plus the hydroxide of the metal. It is not feasible to determine whether or not moisture present in a stearate or palmitate has reacted therewith to cause hydrolysis. The difference between the unhydrolyzed and partially hydrolyzed stearates and palmitates was not appreciated until the unhydrolyzed substances of the present invention were produced and were found to be non-gummy.

The stearates and palmitates of zirconium, titanium and cerium may be replaced by hydroxy stearates and hydroxy palmitates in the practice of the invention.

When commercial stearic acid is employed as one of the starting materials in the preparation of a lubricant, the final product is a mixture of stearates and palmitates, because commercial stearic acid contains a considerable proportion of palmitic acid.

Salts of zirconium, titanium and cerium dissolve only in strong acids. It might be supposed that stearates or palmitates of these metals could be produced by mixing solutions of the metal salts with solutions of a soap of stearic or palmitic acid, just as insoluble calcium soaps are precipitated when a soap solution is added to hard water. When a solution of a salt of one of the three metals is added to a solution of a soap of stearic or palmitic acid, however, high acidity of the salt solution causes free stearic or palmitic acid to precipitate. Heretofore it has been considered impossible to prepare a substantially neutral solution of a zirconium, titanium or cerium salt. Strongly acid solutions of the salts have been prepared, and attempts to reduce the acidity of such solutions by neutralizing or diluting them have heretofore caused hydrolysis of the salts and precipitation of the insoluble hydroxides.

Before the stearates and palmitates could be obtained in non-gummy form it was necessary to prepare a substantially neutral solution of a salt of each metal without precipitation of hydroxides. A solution of the salt in sulfuric acid was first prepared, and the gram equivalents of acid in the solution were then reduced by adding a barium compound, until the solution had been neutralized to the desired degree.

In order to avoid precipitation of hydroxides, the barium compound that is added should reduce the gram equivalents of acid, not reduce merely the hydrogen-ion concentration of the solution.

Barium compounds that may be employed are barium carbonate, barium hydroxide, barium oxide, and barium sulfide. The carbonate and sulfide reduce the gram-equivalents of acid when added to the sulfuric acid solution, because carbon dioxide or hydrogen sulfide is evolved. When barium hydroxide or barium oxide is added to the sulfuric acid solution, the gram-equivalents of acid are reduced, because barium hydroxide or barium oxide reacts with sulfuric acid to form barium sulfate without the production of any acid as a by-product. Among the barium compounds suggested, barium carbonate is preferred, because it dissolves readily in the sulfuric acid solution, and because the termination of the reaction can be observed by watching for the evolution of carbon dioxide to cease. Moreover, carbon dioxide is not offensive like hydrogen sulfide.

Since the solution of the salt, after the addition of the barium compound, is to be mixed with a soap solution in order to precipitate a stearate or palmitate, the amount of the barium compound that should be added is simply an amount which reduces the acidity of the solution enough so that the stearate or palmitate is precipitated substantially free from stearic or palmitic acid.

A lubricant of proper acidity for incorporation in a formaldehyde-urea molding composition can be produced if the quantity of the barium compound added to the sulfuric acid solution before the mixing of the two solutions is sufficient to bring the sulfuric acid solution substantially to neutrality, as to a pH of 6 or 6.5.

Cooling the sulfuric acid solution before the addition of the barium compound and cooling the soap solution are very helpful toward inhibiting hydrolysis.

If desired, there may be incorporated with the lubricant an anti-flocculation agent that does not materially impair the translucency of articles molded from a composition containing the lubricant. Thus the barium sulfate that precipitates when the barium compound is added to the sulfuric acid solution may be allowed to remain in the neutralized solution, so that the final product is an intimate mixture of barium sulfate with the palmitate or stearate. Barium sulfate is inert, does not impair the translucency of the finished molded article, and is believed to have excellent anti-flocculation properties.

A mixture of barium sulfate with zirconium stearate substantially free from stearic or palmitic acid may be prepared as follows:

*(1) Preparation of soap solution*

Commercial triple-pressed stearic acid (10 parts) is melted together with 1 part of water. (The water floats the stearic acid and prevents scorching.) The melted stearic acid is then poured into a solution of 1.5 parts of technical caustic soda flakes in 10 parts of water, contained in a stainless steel tank. After the resulting soap has been agitated for one-half hour with live steam and an electric stirrer, a further quantity (85 parts) of water is added. The soap is then salted out of the solution, and the solution is drained off and replaced by fresh water. In order to remove substantially all the free alkali, the salting out and redissolving of the soap should be repeated four or five times. When the final soap solution is obtained, stirring is recommenced, and the solution is allowed to cool.

(2) Preparation of zirconium sulfate solution

Crushed ice is added to a 20% solution of zirconium sulfate in sulfuric acid, containing 10 parts of zirconium sulfate. Stirring is commenced, and a paste containing equal parts of water and technical precipitated barium carbonate is added until a pH of 6.0 has been attained and effervescence has ceased.

(3) Preparation of powdered product

Crushed ice is added to the soap solution, and the two chilled solutions are mixed. The zirconium stearate and barium sulfate float to the top of the tank, and a considerable proportion of clear liquid may be drained off after two hours. The remaining liquid together with the precipitate is passed through a vacuum filter, and the resulting cake is made into a slurry with fresh water, refiltered, and washed four times with water. After the precipitate has been dried at 100° F. and 10% relative humidity, it is very fluffy and can easily be dispersed into other powders by grinding. The zirconium compound in the powder may consist largely of zirconium dihydroxy distearate.

Enough of this powder may be used in a formaldehyde-urea molding composition so that the finished composition contains about 1 per cent (i. e., from ½ to 1½ per cent) of zirconium stearate. The incorporation of 1 per cent of zirconium stearate in a formaldehyde-urea molding composition does not reduce the translucency of the finished article. In contrast, the use of ½ per cent of zinc stearate causes definite opacification of the molded article. A molding composition containing 1 per cent of zinc stearate produces articles that are so opaque that the composition is entirely unsuitable for some uses.

Various embodiments of the invention may be devised to meet various requirements.

Having described my invention, I claim:

1. A method of preparing a formaldehyde-urea composition for molding that comprises grinding therewith a substantially neutral salt selected from the group consisting of hydroxy stearates, hydroxy palmitates, stearates and palmitates of zirconium, titanium and cerium.

2. A method of preparing a formaldehyde-urea composition for molding that comprises grinding therewith barium sulfate and a substantially neutral salt selected from the group consisting of hydroxy stearates, hydroxy palmitates, stearates and palmitates of zirconium, titanium and cerium.

3. A formaldehyde-urea molding composition for producing molded articles of improved translucency comprising a small proportion of a substantially neutral salt selected from the group consisting of hydroxy stearates, hydroxy palmitates, stearates and palmitates of zirconium, titanium and cerium, as a mold lubricant.

4. A formaldehyde-urea molding composition for producing molded articles of improved translucency comprising a small proportion of substantially neutral zirconium stearate as a mold lubricant.

5. A formaldehyde-urea molding composition for producing molded articles of improved translucency comprising a small proportion of substantially neutral zirconium hydroxy stearate as a mold lubricant.

6. A formaldehyde-urea molding composition for producing molded articles of improved translucency comprising a small proportion of substantially neutral zirconium palmitate as a mold lubricant.

7. A formaldehyde-urea molding composition for producing molded articles of improved translucency comprising about 1 per cent of a substantially neutral salt selected from the group consisting of hydroxy stearates, hydroxy palmitates, stearates and palmitates of zirconium, titanium and cerium, as a mold lubricant.

MAURICE H. BIGELOW.